(12) United States Patent
Luo et al.

(10) Patent No.: US 8,116,168 B1
(45) Date of Patent: Feb. 14, 2012

(54) HYBRID ONE-WAY AND FULL-WAY WAVE EQUATION MIGRATION

(75) Inventors: Mingqiu Luo, Sugar Land, TX (US); Shengwen Jin, Sugar Land, TX (US)

(73) Assignee: Halliburton Energy Services, Inc., Houston, TX (US)

( * ) Notice: Subject to any disclaimer, the term of this patent is extended or adjusted under 35 U.S.C. 154(b) by 792 days.

(21) Appl. No.: 12/214,342

(22) Filed: Jun. 18, 2008

(51) Int. Cl.
*G01V 1/00* (2006.01)

(52) U.S. Cl. .......................................... 367/50; 367/73

(58) Field of Classification Search .................. 367/38, 367/50, 53, 73
See application file for complete search history.

(56) References Cited

U.S. PATENT DOCUMENTS

| | | | |
|---|---|---|---|
| 4,890,242 A | 12/1989 | Sinha et al. | |
| 5,014,230 A | 5/1991 | Sinha et al. | |
| 5,138,584 A | 8/1992 | Hale | |
| 5,274,605 A | 12/1993 | Hill | |
| 5,490,120 A | 2/1996 | Li et al. | |
| 5,530,679 A | 6/1996 | Albertin | |
| 5,544,126 A | 8/1996 | Berryhill | |
| 5,784,334 A | 7/1998 | Sena et al. | |
| 6,002,642 A | 12/1999 | Krebs | |
| 6,021,094 A * | 2/2000 | Ober et al. ...................... 367/53 |
| 6,311,131 B1 | 10/2001 | Peardon et al. | |
| 6,446,007 B1 | 9/2002 | Finn et al. | |
| 7,065,004 B2 | 6/2006 | Jiao et al. | |
| 7,196,969 B1 * | 3/2007 | Karazincir ...................... 367/50 |
| 7,315,783 B2 | 1/2008 | Lou | |
| 7,400,553 B1 * | 7/2008 | Jin et al. .......................... 367/53 |
| 2002/0033832 A1 | 3/2002 | Glatman | |
| 2005/0207278 A1 | 9/2005 | Reshef et al. | |
| 2005/0270537 A1 | 12/2005 | Mian et al. | |
| 2008/0130411 A1 | 6/2008 | Brandsberg-Dahl et al. | |
| 2008/0137480 A1 | 6/2008 | MacNeill | |
| 2009/0213693 A1 | 8/2009 | Du et al. | |
| 2011/0075516 A1 | 3/2011 | Xia et al. | |

FOREIGN PATENT DOCUMENTS

| | | |
|---|---|---|
| WO | WO-2010/082938 | 7/2010 |
| WO | WO-2010/120301 | 10/2010 |
| WO | WO-2011/053327 | 5/2011 |

OTHER PUBLICATIONS

Baysal, Edip et al., "A Tow-/Way Nonreflecting Wave Equation", Geophysics, vol. 49, No. 2, (Feb. 1984),pp. 132-141, 11 Figs.

Baysal, Edip et al., "Reverse Time Migration", Geophysics, vol. 48, No. 11, (Nov. 1983),pp. 1514-1524, 9 Figs.

(Continued)

*Primary Examiner* — Jack Keith
*Assistant Examiner* — Krystine Breier
(74) *Attorney, Agent, or Firm* — Krueger Iselin LLP

(57) ABSTRACT

A migration method using hybrid one-way and full-way (HOF) wave equation propagation. The HOF method extrapolates seismic wavefields in less complex media with a one-way wave equation propagator and extrapolates seismic wavefields in extremely complex media with a full-way wave equation propagator. For prestack depth migration, the HOF extrapolates source-side and receiver-side wavefields independently. Frequency-space domain and time-space domain imaging conditions are applied to the one-way and the full-way extrapolated wavefields, respectively. A suitable amplitude matching factor is introduced to combine the one-way and full-way images. The HOF method is a cost-effective migration that produces superior image quality with less noises and less computational resources.

9 Claims, 4 Drawing Sheets

OTHER PUBLICATIONS

Chang, W. F., et al., "3D Acoustic Prestack Reverse-Time Migration", Geophysical Prospecting 38, (1990), pp. 737-755.
Mufti, I. R., Pita J. A., and Huntley, R. W., 1996, Finite-Difference Depth Migration of Exploration Scale 3-D Seismic Data, Geophysics, vol. 61, (1996), pp. 776-794.
Jin, Shengwen et al., "Depth Migration Using the Windowed Generalized Screen Propagators", 1998 SEG Expanded Abstracts, (1998), pp. 1-4.
Jin, Shengwen et al., "Illumination Amplitude Correction with Beamlet Migration", Acquisition/Processing, The Leading Edge, (Sep. 2006), pp. 1045-1050.
Jin, Shengwen et al., "One-Return Wave Equation Migration: Imaging of Duplex Waves", SEG/New Orleans 2006 Annual Meeting, New Orleans, LA, (Fall 2006), pp. 2338-2342.
Jin, Shengwen, et al., One-Return Wave Equation Migration, U.S. Appl. No. 11/606,551, filed Nov. 30, 2006 (Issued Jul. 15, 2008).
Luo, Mingqui et al., "3D Beamlet Prestack Depth Migration Using the Local Cosine Basis Propagator", Modeling and Imaging Laboratory, IGPP, University of California, Santa Cruz, CA, (2003),pp. 1-4.
McMechan, G. A., "Migration by Extrapolation of Time-Dependent Boundary Values", Geophysical Prospecting 31 (1983),pp. 413-320.
PCT International Search Report and Written Opinion, dated Feb. 20, 2009, Appl No. PCT/US/0931400, "Data Acquisition and Prestack Migration Based on Seismic Visibility Analysis", filed Jan. 19, 2009.
Stoffa, P. L., et al., "Split-Step Fourier Migration", Geophysics, vol. 55, No. 4, (Apr. 1990),pp. 410-421, 11 Figs.
Ristow, Dietrich et al., "Fourier Finite-Difference Migration", Geophysics, vol. 59, No. 12, p. 18821893, 5 Figs., (Dec. 1984), pp. 1882-1893.
Whitmore, N. D., "Iterative Depth Migration by Backward Time Propagation", Seismic 10- Migration, S10.1, (1983), pp. 382-385.
Wu, W., Analysis of Higher-Order, Finite-Difference Schemes in 3-D Reverse-Time Migration: Geophysics, vol. 61, (1996), pp. 845-856.
Xu, Shiyong et al., "An Orthogonal One-Return Wave Equation Migration", SEG San Antonio 2007 Annual Meeting, San Antonio, TX, (Fall 2007), 5 pages.
Xu, Shiyong et al., "Can We Image Beneath Salt Body—Target-Oriented Visibility Analysis", SEG Houston 2005 Annual Meeting, SPMI 6.8, Houston, TX, (Fall 2005),5 pages.
Xu, Shiyong et al., "Wave Equation Migration of Turning Waves", SEG New Orleans 2006 Annual Meeting, (Fall 2006), 5 pages.
Yoon, Kwangjin et al., "Challenges in Reverse-Time Migration", SEC Int'l Exposition and 74th Annual Meeting, Denver, Colorado, (Oct. 10, 2004), 4 pages.
Fourier finite-difference migration Ristow & Ruhl 1993 Split-step Fourier migration Stoffa et al 1989 Depth migration using the windowed generalized screen propogators Jin et al 1998 3D beamlet prestack depth migration using the local cosine basis propagator Luo at at Reverse time migration Baysal et al 1982.
A two-way nonreflecting wave equation Baysal et al 1982 Analsis of higher-order, finite-difference schemes in 3-D reverse-time migration Wu et al 1994 Finite-difference depth migration of exploration-scale 3-D seismic data Mufti et al 1995 Challenges in reverse-time migration Yoon et al 2004 B035 The 2004 BP Velocity Benchmark Billette et al 2005.
Bear, Glenn et al., "The Construction of Subsurface Illumination and Amplitude Maps via Ray Tracing", The Leading Edge, 19(7), (2000), pp. 726-728.
Cerjan, Charles "Short Note: A Nonreflecting Boundary Condition for Discrete Acoustic and Elastic Wave Equations", Geophysics, vol. 50, No. 1, (Apr. 1985), pp. 705-708.
Conry, Michael et al., "Mechanics of Composite Materials—Lecture 3", 4th Year Materials Engineering, (2004), pp. 1-8.
Dablain, M A., "The Application of High-order Differencing to the Scalar Wave Equation", Geophysics, vol. 51, No. 1, 13 Figs., 1 Table, (Jan. 1986), pp. 54-66.
Duveneck, Eric et al., "Acoustic VTI Wave Equations and Their Applications for Anisotropic Reverse-Time Migration", SEG Las Vegas 2008 Annual Meeeting, (2008), pp. 2186-2190.

Etgen, John T., "Residual Prestack Migration and Interval-Velocity Estimation", Printed as Stanford Exploration Project No. 68, Copyright 1900, (Oct. 1990), pp. ii-xiii.
Fomel, Sergey "Migration and Velocity Analysis by Velocity Continuation", Stanford Exploration Project, Report Sergey, (Nov, 9, 2000), pp. 643-670
Hoffmann, Jorgen "Illumination, Resolution and Image Quality of PP- and PS-Waves for Survey Planning", The Leading Edge, 20(9), (2001), pp. 1008-1014.
Komatitsch, Dimitri et al., "A Perfectly Matched Layer Absorbing Boundary Condition for the Second-Order Seismic Wave Equation", Geophys, J. Int. 154, (2003, pp. 146-153.
Kosloff, Dan D., et al., "Forward Modeling by Fourier Method", Geophysics, vol. 47, No. 10 (Oct. 1982), pp. 1402-1412.
Kuehl, Henning et al., "Generalized Least-Squares DSR Migration Using a Common Angle Imaging Condition", SEG Conference, San Antonio, Texas, (Fall 2001) 4 pgs.
Lesage, Anne-Cecile et al., "3D Reverse-Time Migration with Hybrid Finite Difference-Pseudospectral Method", SEG Las Vegas 2008 Annual Meeting, (2008),pp. 2257-2261.
Liu, Zhenyue "An Analytical Approach to Migration Velocity Analysis", Geophysics, vol. 62, No. 4, (Jul. 1998), pp. 1238-1249, 17 Figs, 1 Table.
Luo, M. et al., "Recover Scattering Wave Amplitudes from Back Propagated Waves", Technical Report No. 12, Modeling and Imaging Project, University of California, Santa Cruz, (2005),pp. 25-33.
Meng, Zhaobo et al., "3D Analytical Migration Velocity Analysis I: Two-step Velocity Estimation by Reflector-Normal Update", 69th Annual International Meeting SEG, Expanded Abstracts, 4 pgs.
Meng, Zhaobo et al., "3D Global Tomographic Velocity Model Building", SEG Int'l Exposition and 74th Annual Meeting, Denver, Colorado, (Oct. 10, 2004),pp. 1-4.
Mosher, Charles C., et al., "Migration Velocity Analysis Using Common Angle Image Gathers", 71st Annual International, SEG, Expanded Abstracts,, pp. 889-892.
Muerdter, David et al., "Understanding Subsalt Illumination through Ray-Trace Modeling, Part 1: Simple 2 D Salt Models", The Leading Edge, 20(6), (2001), pp. 578-594.
Muerdter, David et al., "Understanding Subsalt Illumination through Ray-Trace Modeling, Part 2: Dippling Salt Bodies, Salt Peaks, and Non-reciprocity of Subsalt Amplitude Response", The Leading Edge, 20(7), (2001), pp. 688-697.
Muerdter, David et al., "Understanding Subsalt Illumination Through Ray-Trace Modeling, Part 3: Salt Ridges and Furrows, and Impact of Acquisition Orientation", The Leading Edge, 20(8), (2001), pp. 803-816.
PCT International Search Report and Written Opinion, dated Jun. 8, 2009, Appl. No. PCT/US2009/040793, "Seismic Imaging Systems and Methods Employing a Fast Target-Oriented Illumination Calculation", filed Apr. 16, 2009, 9 pgs.
PCT Internat'l Search Report and Written Opinion, dated Dec. 18, 2009, Appl No. PCT/US09/62911, "Seismic Imaging Systems and Methods Employing 3D Reverse Time Migration with Tilted Transverse Isotropy", filed Nov. 2, 2009, 9 pgs.
Prucha, Marie L., et al., "Angle-Domain Common Image Gathers by Wave-Equation Migration", Stanford Exploration Project, Report 100,, (Apr. 20, 1999),pp. 101-113.
Sava, Paul "Wave-Equation Migration Velocity Analysis—I: Theory", Stanford Exploration Project, (Jul. 22, 2004), pp. 1-37.
Sava, Paul C., et al., "Angle-Domain Common-Image Gathers by Wavefield Continuation Methods", Geophysics, vol. 68, No. 3, (May 2003),pp. 1065-1074, 14 Figs.
Schneider, William A., et al., "Efficient and Accurate Modeling of 3-D Seismic Illumination", SEG Expanded Abstracts 18, (Fall 1999), pp. 633-636.
Stork, C. et al., "Linear Aspects of Tomographic Velocity Analysis", Geophysics, vol. 56, pp. 483-495.
Stork, C. et al., "Reflection Tomography in the Postmigrated Domain", Geophysics, vol. 57, No. 5, pp. 680-692.
Van Trier, Johannes A., "Tomographic Determination of Structural Velocities from Depth-Migrated Seismic Data", Printed as Stanford Exploration Project No. 66, (1990), pp. ii-xii.

Wu, R. S., et al., "Mapping Directional Illumination and Acquisition-Aperture Efficacy by Beamlet Propagator", SEG Expanded Abstracts 21, (2002), pp. 1352.

Xia, Fan et al., "Sensitivity Kernel-Based Migration Velocity Analysis in 3D Anisotropic Media", U.S. Patent Appliction, filed Feb. 24, 2011, 23 pages.

Xia, Fan et al., "Seismic Imaging Systems and Methods Employing Tomographic Migration-Velocity Analysis Using common Angle Image Gathers", U.S. Appl. No. 12/566,885, filed Sep. 25, 2009, 20 pages.

Xia, Fan et al., "Tomographic Migration-Velocity Analysis Using Common Angle Image Gathers", SEG Annual Conference, Las Vegas, Nevada, (Nov. 9, 2008), pp. 3103-3107.

Xie, Xiao B., et al., "A Wave-Equation Migration Velocity Analysis Approach based on the Finite-Frequency Sensitivity Kernal", SEG Annual Meeting, Oct. 2008, 5 pgs., 5 pgs.

Xie, Xiao B., et al., "Extracting an Angle Domain Information from Migrated Wavefield", SEG 72nd Annual Meeting, Expanded Abstracts 21, (Oct. 6, 2002), p. 1352.

Xie, Xiao B., et al., "The Finite-Frequency Sensitivity Kernel for Migration Residual Moveout and its Application in Migration Velocity Analysis", Geophysics, vol. 73, No. 6, Nov.-Dec. 2008, pp. 241-249.

Xie, Xiao B., et al., "Three-Dimensional Illumination Analysis Using Wave Equation Based Propagator", SEG Expanded Abstracts 22, (2003), pp. 1360-1363.

Xie, Xiao-Bi et al., "Wave-Equation-Based Seismic Illumination Analysis", Geophysics, vol. 71, No. 5, (Sep. 20, 2006), pp. S169-S177, and 10 Figs.

Youn*, Oong K., et al., "Depth Imaging with Multiples", Geophysics, vol., 66, No. 1, (Jan./Feb. 2001), pp. 246-255.

Zhou, Hongbo et al., "Tomographic Residual Curvature Analysis: The Process and its Components", 73rd Annual International Meeting, SEG, 4 pgs.

\* cited by examiner

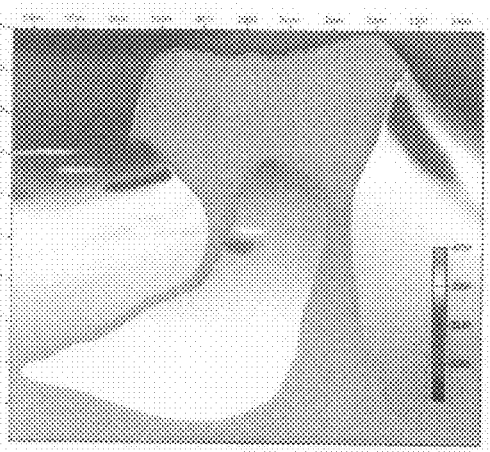
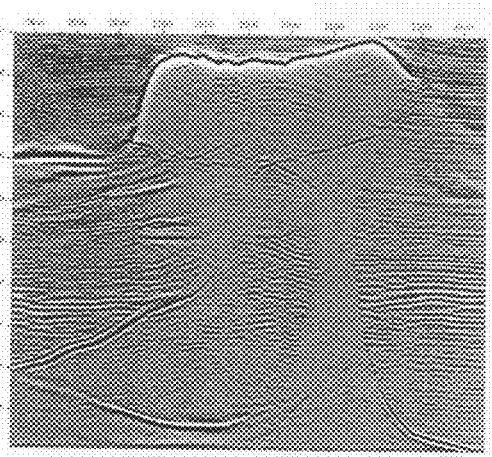
Fig. 3(a)
Fig. 3(b)
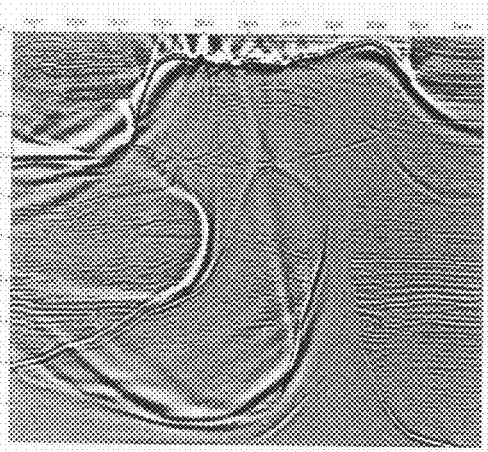
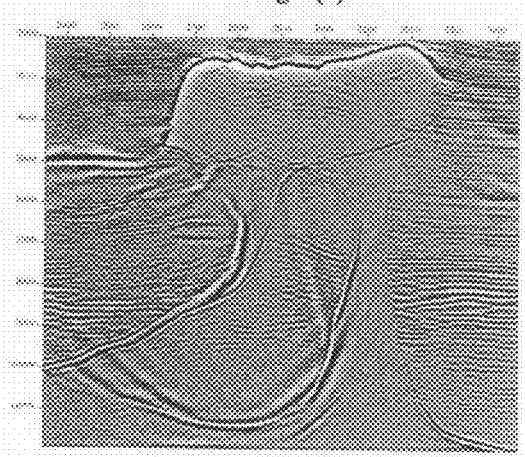
Fig. 3(c)
Fig. 3(d)

HYBRID ONE-WAY AND FULL-WAY WAVE EQUATION MIGRATION

BACKGROUND OF THE INVENTION

1. The Field of the Invention

The present invention pertains to a Hybrid One-way and Full-way (HOF) wave equation migration method for seismic imaging. With this HOF method, a one-way wave equation propagator is applied in extremely complicated geologic media with strong turning waves and duplex waves. For prestack depth migration, the source and receiver wavefields are extrapolated independently using the HOF propagator. A frequency-space domain imaging condition is applied at each frequency for one way extrapolation, while a time-space domain imaging condition is applied at each time slice for full-way extrapolation. An amplitude matching factor is introduced to form the final subsurface image from the one-way and full-way migrations. The HOF migration produces superior image quality over a one-way method. Compared with a full-way wave equation migration, the HOF migration significantly improves the computational efficiency, saves computational resources, and reduces the wavefield noise.

2. The Prior Art

In a frequency-space domain, a full-way wave equation can be decoupled into up-going and down-going wave equations. One-way wave equation migration methods, such as Finite-Difference (FD) scheme, Split Step Fourier (SSF), Fourier Finite Difference (FFD), Generalized Screen Propagator (GSP), and Local Cosine Beamlet (LCB) methods extrapolate down-going waves and are able to handle strong lateral velocity variations with great accuracy and efficiency Stoffa et. Al., (1990) propose an SSF method that was implemented in both frequency-space and frequency-wave number domains. SSF migration handles smoothly laterally varying velocity. Ristow and Rühl, (1994) proposed an FFD method wherein the downward continuation operator is split into two downward-continuation operators: one is a phase-shift operator for chosen constant background velocity, and the other is an optimized finite-difference operator for the arbitrary velocity function. FFD migration shows a better maximum dip-angle behavior than the SSF method. The dip limitation depends on the variation of the velocity field. Jin and Wu, (1998) proposed a windowed GSP method wherein the velocity field i9s partitioned into a few blocks in which the velocity perturbation is small. Within each block, a GSP migration is applied by using windowed Fourier transform. Luo and Wu (2003) proposed a LCB method that decomposes the wavefield into beamlets. Each beamlet propagates itself. The beamlets are coupled to each other after propagating to the next depth level. Small velocity perturbation within each beamlet and the orthogonal local cosine basis lead to the high accuracy and efficiency for the migration. Because of neglecting the up-going waves, all of these one-way methods don't take into account turning waves and duplex waves. Therefore, the one-way methods fail to reconstruct any vertical fault or salt overhang, as well as some subsalt events contributed from the overturned reflections and duplex waves.

To address the imaging problem encountered in one-way migration, the full-way wave equation, known as Reverse-Time Migration (RTM), extrapolates both down-going and up-going waves simultaneously. Baysal et al. (1983) proposed a RTM method by reverse extrapolation it time. No approximation is applied to the full-way wave equation. It can handle steeply dipping structures in a completely variable velocity medium. Baysal et al., (1984) further proposed a two-way non-reflecting wave equation to highly reduce the reflection coefficients for transmission across the material boundaries and interfaces. It can be useful when there's a need to avoid the strong interlayer reverberations. Whitmore, (1983) proposed an iterative depth migration by backward time prolongation. The migration is conducted in time domain with the time-reversed seismic section applied as upper surface boundary conditions. Chang and McMechan (1990) implemented a 3D common-shot prestack RTM using an excitation-time imaging condition for each imaging point in a 3D volume. Yoon et. Al. (2004) presented several challenges to remove artifacts in RTM migration and to increase the computational efficiency. In RTM migration, most wave modes that physically favor the wave propagation are correctly imaged if the geologic velocity model is true. Since there's no approximation to the full-way wave equation, RTM can image very steep dip and even vertical events. However, there are lots of technical issues that limit the practical application of RTM, such as numerical dispersion for high frequency wavefields, strong wavefield noise for a sharp boundary with strong velocity contrast, large disk space and large memory space required, and computationally expensive, etc. There are also many techniques proposed to deal with such issues, for example, choosing suitable Finite Difference schemes to improve the computation efficiency and taking less memory space, storing the useful wavefield with larger grid spacing may save disk space, cutting the model into several smaller pieces can save memory and disk space; and selecting properly designed imaging conditions can reduce the background noise. But even with these efforts, RTM is still a heavy burden for 3D seismic imaging.

In real earth models, the shallow geologic structures are usually simple, especially for seismic exploration in deepwater, such as in the Gulf of Mexico where the shallow portion is covered by water which has a constant velocity. In this case, one-way wave equation migration is good enough to produce a superior image. Since the shallow velocity is lower, it requires a finer grid spacing for full-way wave equation migration to reduce the effect caused by the numerical dispersion, thus dramatically increasing the computational cost. For salt dome structures, the velocity contrast is very strong between the sediment and salt body. Full-way migration usually generates strong wavefield noises caused by the grid diffractions at the sharp boundary. One-way migration produces a clean image with acceptable accuracy for imaging the shallow structures. However, the geologic structures are more complex in deep part, full-way migration is a better method to image complex structures. The present invention makes it possible to get high quality image for both shallow and deep parts of the whole model. The inventors propose a Hybrid One-way and Full-way (HOF) wave equation migration method by taking advantages from both one-way and full-way migration methods. One-way wave equation migration is conducted on the shallow part of the model, while full-way wave equation is conducted on the deep part of the model with complicated geologic structures in complex geologic medium where turning waves and duplex reflections have significant contributions.

There are two primary benefits for the subject HOF migration method. One is the improved image quality, better imaging in the shallow part of the geologic model with much less background noise and in the deep part with high accuracy. The other is greatly improving the computational efficiency and requiring less disk space and memory space, which are critical for 3-D seismic imaging.

In this disclosure, the inventors propose a Hybrid One-way and Full-way wave equation Migration method (HOF) for seismic imaging. The target oriented character and strategy are also disclosed for the migration with HOF.

SUMMARY OF THE INVENTION

The subject method uses Hybrid One-way and Full-way (HOF) wave equation migration. This method extrapolates seismic wavefields in less complex media with a one-way wave equation propagator and extrapolates seismic wavefield in extremely complex media with a full-way equation propagator. For prestack migration, the subject HOF migration method extrapolates the source-side and receiver-side wavefields independently. Frequency-space domain and time-space domain imaging conditions are applied to the one-way wavefield and the full-way wavefield, respectively. An amplitude matching factor is introduced to form the final subsurface image from one-way and full-way migrations. In field seismic data processing, full-way migration needs to be applied in the target area for the imaging of complex structures with strong contributions from the turning waves and duplex reflections. One-way migration is conducted on the other areas with smoothly varying velocity media. By taking advantage of both one-way and full-way methods, the subject HOF method will significantly reduce the background noise and save the computational resources, not only for the computational time, but also for the memory and disk space, without degrading the image quality.

BRIEF DESCRIPTION OF THE DRAWINGS

The present invention will now be described with reference to the accompanying drawings, in which:

FIG. 1(c) illustrating subject HOF method that selects the down-going waves in certain areas using one-way propagator and both down-going and up-going waves in other areas using full-way propagator;

FIGS. 3(a) to 3(d) show, on an enlarged scale, the center part of the BP 2D model, as shown in FIG. 2.

DETAILED DESCRIPTION OF THE INVENTION

Figure 1A:
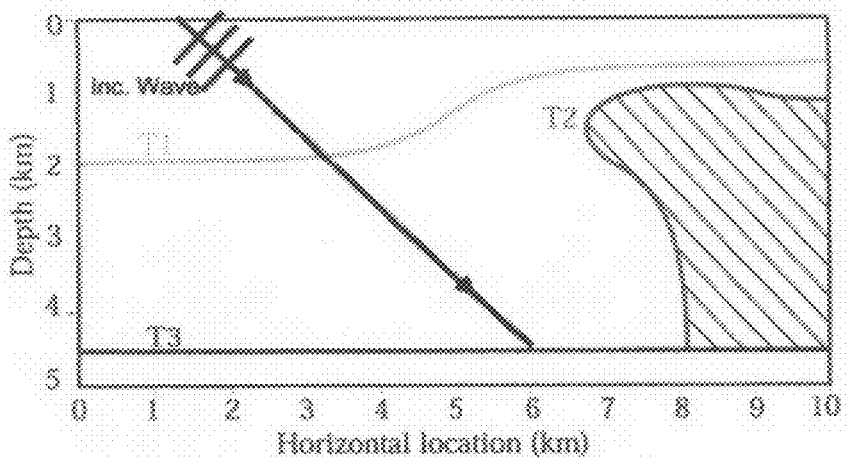
FIG. 1(a) to 1(c) demonstrates the concept of the subject Hybrid One-way and Full-way (HOF) wave propagation with FIG. 1(a) illustrating the wave propagation with one-way wave equation, that only handles the down-going waves in the whole geologic model, FIG. 1(b) illustrating the full-way wave propagation that takes into account both down-going and up-going waves at each interface.
Figure 1B:
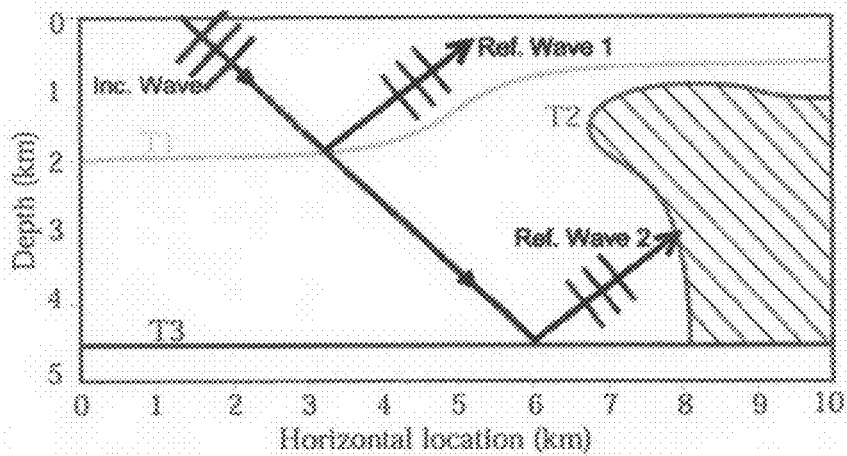
Figure 1C:
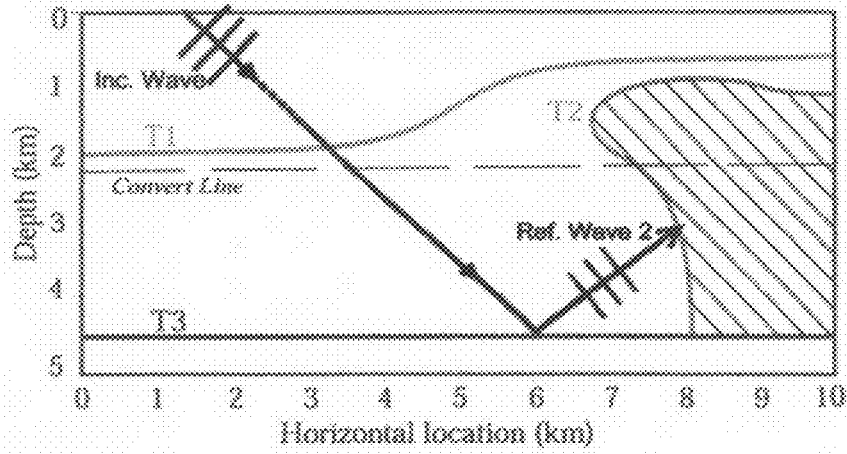

Generally, the scalar seismic wave propagation equation, in Cartesian coordinate, is expressed as, $$\left[\partial_x^2 + \partial_y^2 + \partial_z^2 - \frac{1}{v^2}(x, y, z)\partial_t^2\right]u(x, y, z, t) = 0 \quad (1)$$

where t denotes time, (x, y, z) denotes the 3-dimensional space coordinate, $v^2(x,y,z)$ is velocity of the medium and u(x, y, z, t) stands for the wavefield time-space domain. By transforming into frequency domain, equation (1) becomes, $$[\partial_x^2 + \partial_y^2 + \partial_z^2 + \omega^2/v^2(x,y,z)]u(x,y,z,\omega) = 0 \quad (2)$$

where ω denotes frequency, and u(x, y, z, ω) stands for the wavefield in frequency-space domain. The numerical simulation of the seismic wave propagation based on equation (1), in time-space domain, is equivalent to equation (2), in frequency-space domain. Both equations (1) and (2) are known as full-way wave equations. The frequency domain wavefield can be easily decoupled into a pair of up-going and down-going waves which are governed by the up-going and down-going one-way wave equations, respectively. The one-way wave equation is described as:

$$\frac{\partial u(x, y, z, \omega)}{\partial z} = \pm \sqrt{\omega^2/v^2(x, y, z) + (\partial_x^2 + \partial_y^2)u(x, y, z, \omega)} \quad (3)$$

where +/− denoted up-going and down going waves, respectively.

The difference between one-way and full-way wave propagation will now be considered. The frequency domain wavefield can be decomposed into a superposition of plane waves. Referencing to the depth direction, the plane waves are decoupled into up-going waves and down-going waves. The full-way wave equation migration extrapolates down-going and up-going waves simultaneously for both source-side and receiver-side wavefields. The one-way wave equation migration extrapolates the down-going waves for the source-side wavefield and up-going waves for the receiver-side wavefield. In constant velocity medium, the extrapolated wavefields are identical between one-way and full-way, because there are no up-going reflections. In varying velocity medium, both down-going and up-going waves are present at each imaging location. In this case, one-way migration only takes into account up-going or down-going waves by downward extrapolation, while full-way migration handles both up-going and down-going waves by downward and upward extrapolations simultaneously.

Turning now to the prestack migration using the subject HOF method, the source and receiver wavefields are independently extrapolated followed by a suitable imaging condition to produce the subsurface image. For one-way method implemented in frequency-space domain, a cross-correlation imaging condition is applied at each image point for all frequencies, i.e.:

$$I_f(x, y, z) = \sum_{i\omega=1}^{n\omega} u_s(x, y, z, i\omega) \cdot u_r(x, y, z, i\omega) \quad (4)$$

where $u_s(x, y, z, \omega)$ and $u_r(x,y,z,\omega)$ denote the source and receiver wavefields, respectively, in frequency-space domain, and $I_f(x, y, z)$ denotes the images from frequency-space domain imaging condition For a full-way wave method, the source and receiver wavefields at each time slice are propagated in space domain with reverse time. The imaging condition is applied at each image point for all time slices, i.e.

$$I_{t(x,y,z)} = \sum_{it=1}^{nt} u_s(x, y, z, it) * u_r(x, y, z, it) \quad (5)$$

where $u_s(x,y,z,t)$ and $u_r(x,y,z,t)$ denote the source side and receiver side wave fields, respectively, at each time slice and $I_t(x,y,z)$ denotes the images from time domain imaging condition.

Since for the subject HOF method, frequency-space domain imaging condition (4) is usually applied to one-way migration while time-space domain imaging condition (5) is usually applied to full-way migration, to make the image amplitudes of one-way and full-way migrations match each other, an amplitude matching factor is introduced and applied to one-way and full-way images, i.e.:

$$I(x,y,z) = I_f(x,y,z) + \alpha \cdot I_t(x,y,z) \quad (6)$$

where I(x, y, z) denotes the final images, and α is an amplitude matching factor which depends on the migration parameters, such as frequency integer range and time integer range.

In practical field data image processing, it is unnecessary to use the most accurate but most expensive full-way migration method for all data. Only for those structures where the contributions from overturned waves and duplex waves are significant, full-way migration needs to be conducted. Since overturned waves and duplex waves usually affect the image for some local events, full-way migration is applied to just the specific target area instead of the whole model, which will dramatically save the computational resources, not only or the computational time, but also for the memory and disk spaces. In other areas, one-way migration is able to produce good images.

Figure 2A:
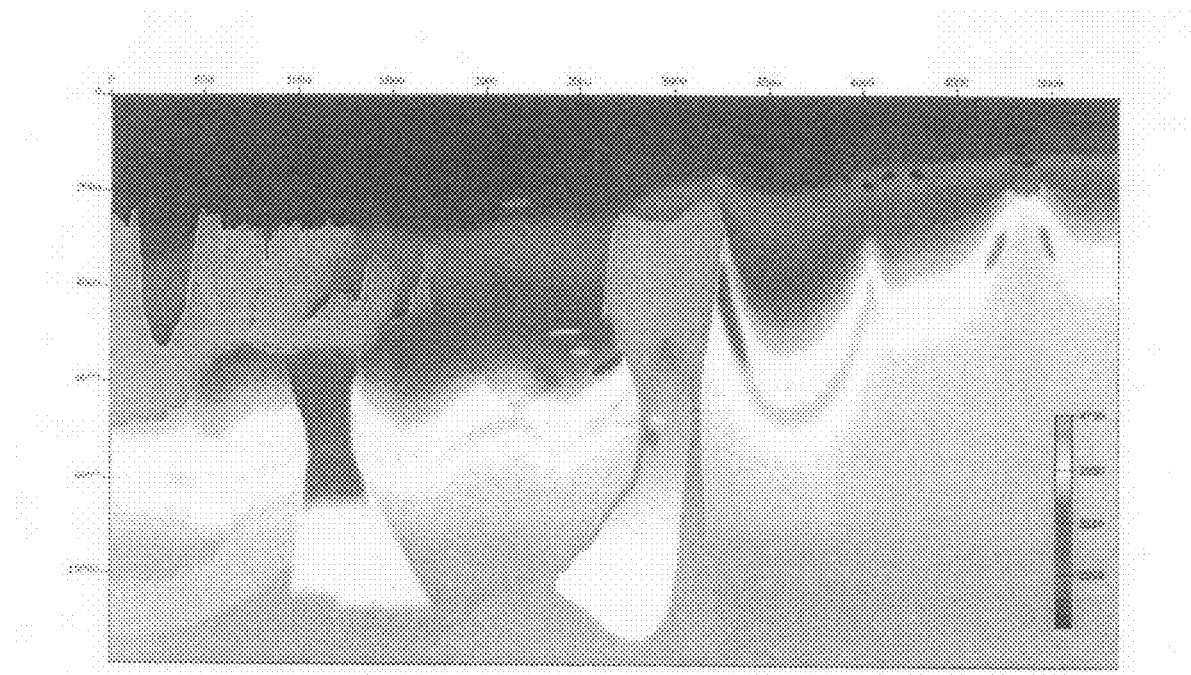
FIGS. 2(a) to (d) show a comparison of prestack migration on the benchmark BP 2D model with FIG. 2(a) being 2D BP velocity model, FIG. 2(b) a prestack depth image by one-way wave equation migration, FIG. 2(c) a prestack depth image by full-way wave equation migration, and FIG. 2(d) a prestack depth image by hybrid one-way and full-way (HOF) wave equation migration.
Figure 2B:
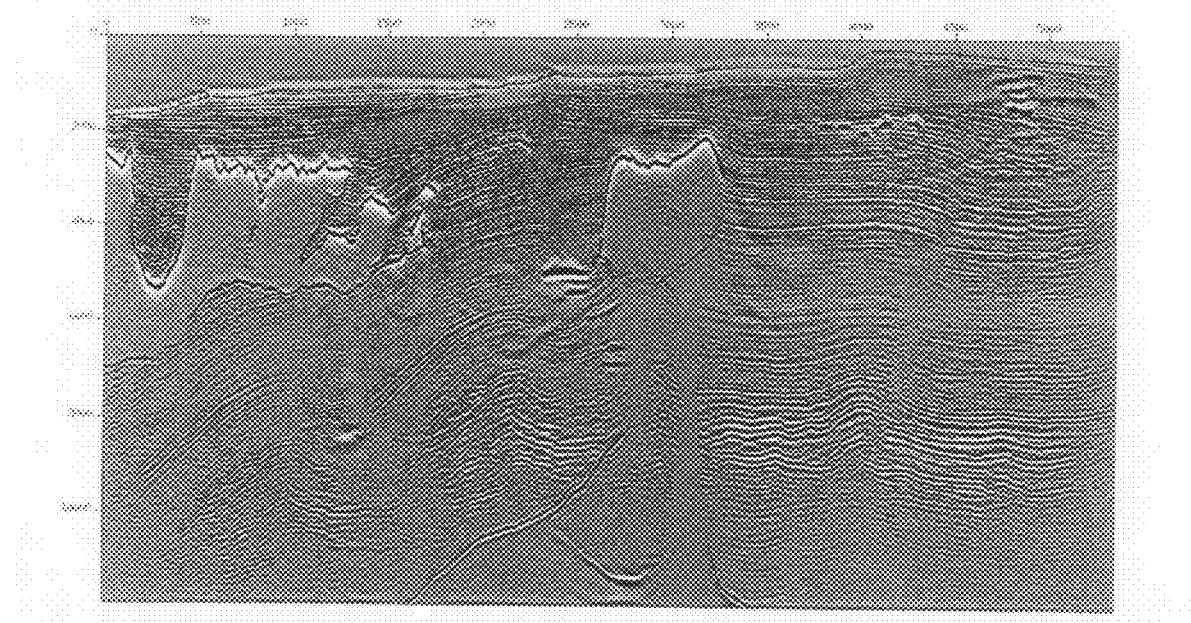
Figure 2C:
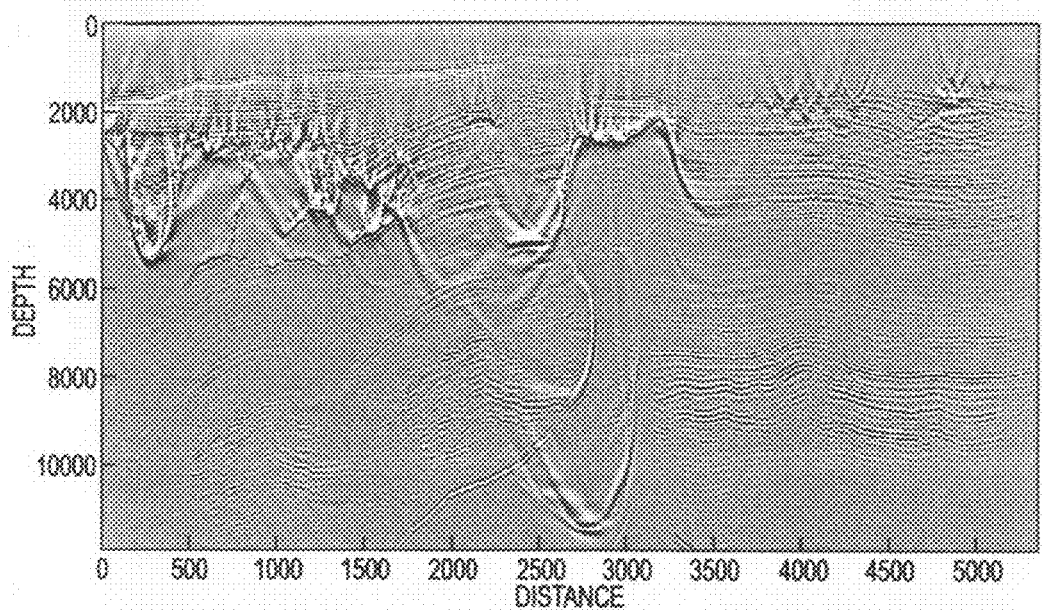
Figure 2D:
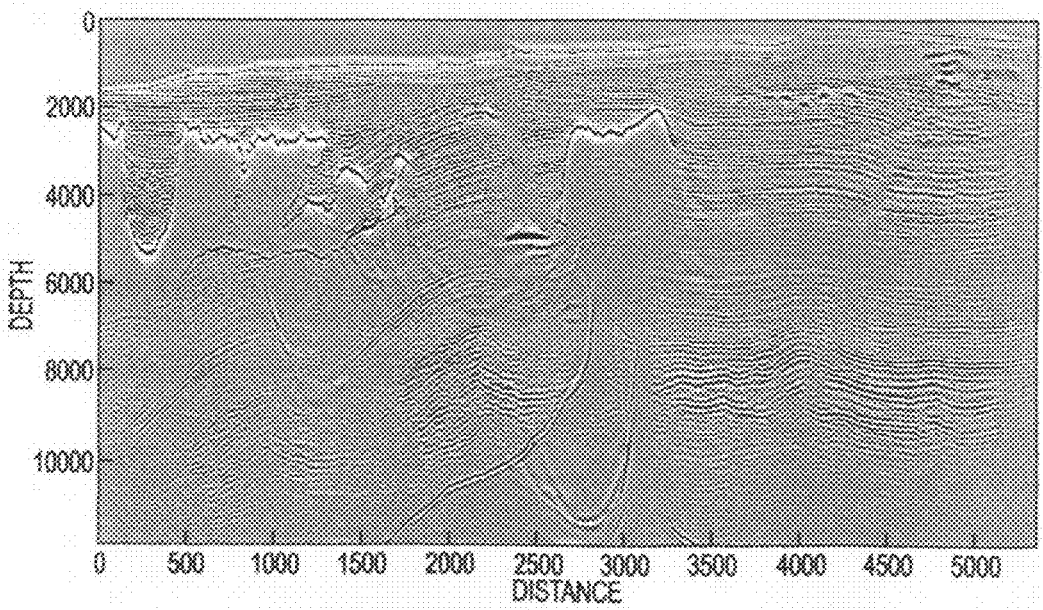

The above strategy is used for the migration on the benchmark BP 2D model (Billette and Brandesberg-Dahl, 2005). As shown in FIG. 2(a), the left part of the model is representative of geology in the deep water of the Gulf of Mexico and consists of a simple background with a complex rugose salt body. The center part of the BP model consists of a deeply rooted salt body in which salt delineation is the main challenge. FIG. 2(b) shows the prestack depth image obtained by one-way wave equation migration. The salt body in the left part is well imaged. However, most salt boundaries are missing on the deeply rooted salt body in the center part. FIG. 2(c) shows the prestack depth image obtained by full-way wave equation migration. The steeply dipping salt boundaries on the deeply rooted salt body are clearly reconstructed. However, strong wavefield noises are present near the top of salt. We select the deeply rooted salt body as a target for hybrid one-way and full-way (HOF) wave equation migration. The convert line is set at a depth of 4.6 km in this experiment. One-way migration is conducted above the convert line, while full-way migration is conducted below this line. FIG. 2(d) shows the prestack depth image obtained by the subject HOF migration. As expected, the deeply rooted salt boundaries are clearly imaged in addition to producing the clean image for the top of the salt.

FIGS. 3(a) to 3(d) show, on an enlarged scale, the center part of the model. In terms of the computational cost, HOF migration is nearly twice as fast as full-way migration. Since large grids are used in migration, HOF requires much less memory and disk spaces than full-way migration.

The present invention may be subject to many modifications and changes without departing from the spirit or essential characteristics thereof. The present description should therefor be considered in all respects as illustrative and not restrictive of the scope of the subject invention as defined by the appended claims.

We claim:

1. A hybrid one-way and full-way wave (HOF) equation migration-based method for seismic imaging, comprising the steps of:

separating a geologic model into a first part representing a less complex medium that lacks strong turning and duplex waves and a second part representing a more complex medium having strong turning and duplex waves;

applying a one-way wave equation propagator to obtain source-side and receiver-side wavefields associated with the first part;

applying a full-way wave equation propagator to obtain source-side and receiver-side wavefields associated with the second part;

applying a frequency-space domain imaging condition to derive a first image from the source-side and receiver-side wavefields associated with the first part;

applying a time-space domain imaging condition to derive a second image from the source-side and receiver-side wavefields associated with the second part; and employing an amplitude matching factor to combine the first and second images into a final subsurface image.

2. A seismic imaging method that comprises:

processing seismic data to extrapolate source-side and receiver-side wavefields throughout a geologic model, said processing employing full-way wave equation migration in a target area of the geologic model and one-way wave equation migration elsewhere in the geologic model;

deriving a first image from: a source-side wavefield obtained via one-way wave equation migration, and a receiver-side wavefield obtained via one-way wave equation migration;

deriving a second image from: a source-side wavefield obtained via full-way wave equation migration, and a receiver-side wavefield obtained via full-way wave equation migration; and forming a subsurface image based at least in part on the first and second images.

3. The method of claim 2, wherein the one-way wave equation migration is performed in a frequency-space domain.

4. The method of claim 3, wherein said first image is a function of spatial coordinates and said deriving a first image includes, for each spatial coordinate: cross-correlating the source-side and receiver-side wavefields for all frequencies.

5. The method of claim 3, wherein the full-way wave equation migration is performed in a time-space domain.

6. The method of claim 5, wherein the geologic model is separated depth-wise into a shallow part and a deep part, with the one-way wave equation migration employed on the shallow part and the full-way wave equation migration employed on the deep part.

7. The method of claim 2, wherein the full-way wave equation migration is performed in a time-space domain.

8. The method of claim 7, wherein said second image is a function of spatial coordinates and said deriving a second image include, for each spatial coordinate: cross-correlating the source-side and receiver-side wavefields for all time slices.

9. The method of claim 2, wherein said subsurface image is a prestack depth image obtained as a weighted sum of the first and second images.

* * * * *